US012583996B2

(12) United States Patent
Tsai et al.

(10) Patent No.: US 12,583,996 B2
(45) Date of Patent: Mar. 24, 2026

(54) METHOD FOR MAKING A POLYMER COMPOSITION

(71) Applicant: Milliken & Company, Spartanburg, SC (US)

(72) Inventors: Chi-Chun Tsai, Boiling Springs, SC (US); Shane M. Waybright, Boiling Springs, SC (US); Keith A. Keller, Spartanburg, SC (US)

(73) Assignee: Miliken & Company, Spartanburg, SC (US)

( * ) Notice: Subject to any disclaimer, the term of this patent is extended or adjusted under 35 U.S.C. 154(b) by 0 days.

(21) Appl. No.: 18/624,839

(22) Filed: Apr. 2, 2024

(65) Prior Publication Data

US 2024/0254314 A1 Aug. 1, 2024

Related U.S. Application Data

(63) Continuation of application No. 17/347,482, filed on Jun. 14, 2021, now abandoned, which is a continuation of application No. 15/664,146, filed on Jul. 31, 2017, now abandoned.

(60) Provisional application No. 62/373,703, filed on Aug. 11, 2016.

(51) Int. Cl.

| | |
|---|---|
| ***C08K 5/098*** | (2006.01) |
| ***C08J 3/20*** | (2006.01) |
| ***C08K 5/00*** | (2006.01) |
| ***C08K 5/12*** | (2006.01) |
| ***C08K 5/521*** | (2006.01) |
| ***C08K 5/527*** | (2006.01) |
| ***C08L 23/10*** | (2006.01) |

(52) U.S. Cl.
CPC ................. *C08K 5/098* (2013.01); *C08J 3/20* (2013.01); *C08K 5/0083* (2013.01); *C08K 5/12* (2013.01); *C08K 5/521* (2013.01); *C08K 5/527* (2013.01); *C08L 23/10* (2013.01); *C08J 2323/12* (2013.01)

(58) Field of Classification Search
CPC ...... C08K 5/098; C08K 5/0083; C08K 5/521; C08L 23/10; C08L 23/12
See application file for complete search history.

(56) References Cited

U.S. PATENT DOCUMENTS

| | | | | |
|---|---|---|---|---|
| 3,367,926 A | | 2/1968 | Voeks | |
| 4,463,113 A | | 7/1984 | Nakahara | |
| 5,342,868 A | * | 8/1994 | Kimura | C08K 5/527 524/609 |
| 6,465,551 B1 | | 10/2002 | Zhao | |
| 6,521,685 B1 | | 2/2003 | Zhao | |
| 6,555,696 B2 | | 4/2003 | Dotson | |
| 6,559,211 B2 | | 5/2003 | Zhao | |
| 6,562,890 B2 | | 5/2003 | Dotson | |
| 6,582,503 B2 | | 6/2003 | Dotson | |
| 6,583,206 B2 | | 6/2003 | Zhao | |
| 6,585,819 B2 | | 7/2003 | Zhao | |
| 6,586,007 B2 | | 7/2003 | Lake, Jr. | |
| 6,599,971 B2 | | 7/2003 | Dotson | |
| 6,794,033 B2 | | 9/2004 | Morin | |
| 7,879,933 B2 | | 2/2011 | Hanssen | |
| 2003/0236332 A1 | | 12/2003 | Dotson | |
| 2006/0079613 A1 | | 4/2006 | Hanssen | |
| 2007/0066733 A1 | | 3/2007 | Hanssen | |
| 2007/0093605 A1 | | 4/2007 | Adur | |
| 2008/0171834 A1 | * | 7/2008 | Tang | C08K 5/098 525/340 |
| 2011/0218279 A1 | * | 9/2011 | Urushihara | C08K 5/16 524/192 |
| 2013/0065994 A1 | | 3/2013 | Yokota | |
| 2021/0301103 A1 | | 9/2021 | Tsai | |

FOREIGN PATENT DOCUMENTS

| | | | | | |
|---|---|---|---|---|---|
| CN | 101065434 | | | 10/2007 | |
| CN | 101268131 | | | 9/2008 | |
| CN | 103788472 | A | * | 5/2014 | C08K 5/098 |
| JP | S581736 | | | 1/1983 | |
| JP | H05156078 | | | 6/1993 | |
| JP | 10053673 | A | * | 2/1998 | |
| JP | H1053673 | | | 2/1998 | |
| JP | H10251469 | | | 9/1998 | |
| JP | 2006117776 | | | 5/2006 | |
| JP | 2008516069 | | | 5/2008 | |
| JP | 2011246589 | | | 12/2011 | |
| JP | 2012057113 | | | 3/2012 | |
| RU | 2413742 | | | 3/2011 | |
| WO | 2006071721 | | | 7/2006 | |
| WO | 2008085250 | A1 | | 7/2008 | |

OTHER PUBLICATIONS

PCT/US2017/044597 International Search Report, filed Jul. 31, 2017, 5 pages.
PCT/US2017/044597 Written Opinion of the International Searching Authority, filed Jul. 31, 2017, 8 pages.
Translation of CN103788472A, Guo et al., Binary composite polypropylene nucleating agent, preparation method and application, 2014 (Year: 2014).

(Continued)

*Primary Examiner* — Marc S Zimmer
*Assistant Examiner* — Surbhi M Du
(74) *Attorney, Agent, or Firm* — Robert M. Lanning

(57) ABSTRACT

An additive composition comprises phosphate ester anions conforming to a specified structure, aromatic carboxylate anions, optionally cycloaliphatic dicarboxylate anions, aluminum (III) cations, sodium cations, optionally calcium cations, optionally lithium cations, and optionally zinc (II) cations. The anions are present in the additive composition in specified molar percentages. The cations are also present in the additive composition in specified molar percentages.

14 Claims, No Drawings

(56) References Cited

OTHER PUBLICATIONS

Translation of JPH1053673A, Aoki et al., Polypropylene Resin Composition, 1998 (Year: 1998).

* cited by examiner

METHOD FOR MAKING A POLYMER COMPOSITION

CROSS-REFERENCE TO RELATED APPLICATIONS

This application is a continuation of and, pursuant to 35 U.S.C. § 120, claims priority to and the benefit of the filing date of co-pending U.S. patent application Ser. No. 17/347,482 filed on Jun. 14, 2021, which application is a continuation of U.S. patent application Ser. No. 15/664,146 filed on Jul. 31, 2017, which application claims, pursuant to 35 U.S.C. § 119(e), priority to and the benefit of the filing date of U.S. Patent Application No. 62/373,703 filed on Aug. 11, 2016.

TECHNICAL FIELD OF THE INVENTION

This application and the invention described herein is generally directed to additive compositions suitable for use in polymers. In one embodiment, the additive composition is a nucleating agent for polyolefins, such as polypropylene polymers.

BACKGROUND

Several nucleating agents for thermoplastic polymers are known in the art. These nucleating agents generally function by forming nuclei or providing sites for the formation and/or growth of crystals in the thermoplastic polymer as it solidifies from a molten state. The nuclei or sites provided by the nucleating agent allow the crystals to form within the cooling polymer at a higher temperature and/or at a more rapid rate than the crystals will form in the virgin, non-nucleated thermoplastic polymer. These effects can then permit processing of a nucleated thermoplastic polymer composition at cycle times that are shorter than the virgin, non-nucleated thermoplastic polymer.

While polymer nucleating agents may function in a similar manner, not all nucleating agents are created equal. For example, a particular nucleating agent may be very effective at increasing the peak polymer recrystallization temperature of a thermoplastic polymer, but the rapid rate of crystallization induced by such a nucleating agent may cause inconsistent shrinkage of a molded part produced from a thermoplastic polymer composition containing the nucleating agent. Such a nucleating agent may also be ineffective in increasing the stiffness of the molded part to a desirable degree.

Given the complicated interrelationship of these properties and the fact that many nucleating agents exhibit less-than-optimal behavior in at least one respect, a need remains for nucleating agents that are capable of producing thermoplastic polymer compositions exhibiting a more desirable combination of high peak polymer recrystallization temperature, tunable shrinkage, and high stiffness. The additive compositions and polymer compositions described herein seek to fulfill this need.

BRIEF SUMMARY OF THE INVENTION

The invention is generally directed to additive compositions for the nucleation of polyolefins, such as polypropylene polymers. The additive compositions comprise a combination of salts or compounds that provides specified anions and cations in specified molar percentages. In this application, the term "anion" is used to refer to the portion of an organic acid molecule that provides or forms the conjugate base of the organic acid. The term "cation" is used to refer to the metallic element portion of a salt or compound. Within the additive composition, the "anion" and the "cation" may exist as distinct ionic species. However, when certain compounds are used in the additive composition, the interaction between the "anion" and the "cation" may display some covalent character, meaning that the "anion" and the "cation" may not necessarily be present within the composition as distinct ionic species. Thus, the terms "anion" and "cation" used in the application do not imply that the recited species necessarily exist as separate ionic species within the composition; rather, the terms are used for convenience to refer to recognizable portions or moieties within the salts and compounds used to produce the recited additive compositions.

In a first embodiment, the invention provides an additive composition comprising:

(a) phosphate ester anions conforming to the structure of Formula (I)

(I)

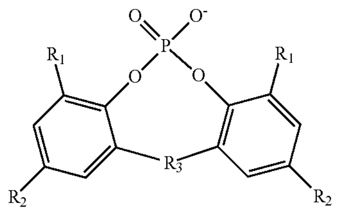

wherein $R_1$ and $R_2$ are independently selected from the group consisting of hydrogen and $C_1$-$C_{18}$ alkyl groups, and $R_3$ is an alkanediyl group;

(b) aromatic carboxylate anions;

(c) aluminum (III) cations;

(d) sodium cations;

(e) optionally, lithium cations; and (f) optionally, zinc (II) cations, wherein:

(i) the phosphate ester anions are present in the additive composition in an amount of about 2 mol. % to about 90 mol. % of the total amount of phosphate ester anions and aromatic carboxylate anions present in the additive composition;

(ii) the aromatic carboxylate anions are present in the additive composition in an amount of about 10 mol. % to about 98 mol. % of the total amount of phosphate ester anions and aromatic carboxylate anions present in the additive composition;

(iii) the aluminum (III) cations are present in the additive composition in an amount of about 1 mol. % to about 35 mol. % of the total amount of aluminum (III) cations, sodium cations, lithium cations, and zinc (II) cations present in the additive composition;

(iv) the sodium cations are present in the additive composition in an amount of about 10 mol. % to about 96 mol. % of the total amount of aluminum (III) cations, sodium cations, lithium cations, and zinc (II) cations present in the additive composition;

(v) the lithium cations, if present, are present in the additive composition in an amount of about 0 mol. % to about 60 mol. % of the total amount of aluminum (III) cations, sodium cations, lithium cations, and zinc (II) cations present in the additive composition;

(vi) the zinc (II) cations, if present, are present in the additive composition in an amount of about 0 mol. % to about 20 mol. % of the total amount of aluminum (III) cations, sodium cations, lithium cations, and zinc (II) cations present in the additive composition; and (vii) the additive composition contains 5 wt. % or more fatty acid salts.

In a second embodiment, the invention provides an additive composition comprising:

(a) phosphate ester anions conforming to the structure of Formula (I)

(I)

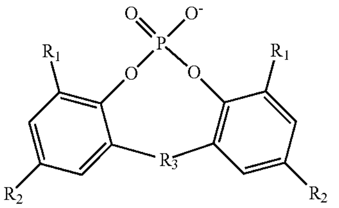

wherein $R_1$ and $R_2$ are independently selected from the group consisting of hydrogen and $C_1$-$C_{18}$ alkyl groups, and $R_3$ is an alkanediyl group;

(b) aromatic carboxylate anions;

(c) cycloaliphatic dicarboxylate anions;

(d) aluminum (III) cations;

(e) sodium cations;

(f) optionally, calcium cations;

(g) optionally, lithium cations; and (h) optionally, zinc (II) cations, wherein:

(i) the phosphate ester anions are present in the additive composition in an amount of about 1.5 mol. % to about 45 mol. % of the total amount of phosphate ester anions, aromatic carboxylate anions, and cycloaliphatic dicarboxylate anions present in the additive composition;

(ii) the aromatic carboxylate anions are present in the additive composition in an amount of about 5 mol. % to about 80 mol. % of the total amount of phosphate ester anions, aromatic carboxylate anions, and cycloaliphatic dicarboxylate anions present in the additive composition;

(iii) the cycloaliphatic dicarboxylate anions are present in the additive composition in an amount of about 3 mol. % to about 55 mol. % of the total amount of phosphate ester anions, aromatic carboxylate anions, and cycloaliphatic dicarboxylate anions present in the additive composition;

(iv) the aluminum (III) cations are present in the additive composition in an amount of about 0.5 mol. % to about 15 mol. % of the total amount of aluminum (III) cations, sodium cations, calcium cations, lithium cations, and zinc (II) cations present in the additive composition;

(v) the sodium cations are present in the additive composition in an amount of about 30 mol. % to about 90 mol. % of the total amount of aluminum (III) cations, sodium cations, calcium cations, lithium cations, and zinc (II) cations present in the additive composition;

(vi) the calcium cations, if present, are present in the additive composition in an amount of about 35 mol. % or less of the total amount of aluminum (III) cations, sodium cations, calcium cations, lithium cations, and zinc (II) cations present in the additive composition;

(vii) the lithium cations, if present, are present in the additive composition in an amount of about 30 mol. % or less of the total amount of aluminum (III) cations, sodium cations, calcium cations, lithium cations, and zinc (II) cations present in the additive composition;

(viii) the zinc (II) cations, if present, are present in the additive composition in an amount of about 15 mol. % or less of the total amount of aluminum (III) cations, sodium cations, calcium cations, lithium cations, and zinc (II) cations present in the additive composition; and (ix) the additive composition contains 5 wt. % or more fatty acid salts.

DETAILED DESCRIPTION OF THE INVENTION

In a first embodiment, the invention provides an additive composition comprising phosphate ester anions, aromatic carboxylate anions, aluminum (III) cations, sodium cations, and at least one fatty acid salt. The additive composition of the first embodiment can optionally comprise lithium cations and/or zinc (II) cations. The anions are present in specified molar percentages, and the cations are present in specified molar percentages. The specified anions present in the additive composition are contributed by one or more phosphate ester salts and one or more aromatic carboxylate salts present in the additive composition. The specified cations present in the additive composition are also contributed by the phosphate ester salt(s) and the aromatic carboxylate salt(s) present in the additive composition, but a portion of the cations are also contributed by the fatty acid salt(s) present in the additive composition.

The additive composition of the first embodiment comprises phosphate ester anions. Preferably, the phosphate ester anions conform to the structure of Formula (I) below (I)

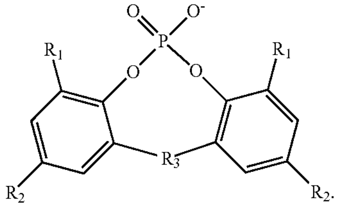

In the structure of Formula (I), $R_1$ and $R_2$ are independently selected from the group consisting of hydrogen and $C_1$-$C_{18}$ alkyl groups, and $R_3$ is an alkanediyl group. In a preferred embodiment, $R_1$ and $R_2$ are selected from the group consisting of hydrogen and $C_1$-$C_4$ alkyl groups. More preferably, $R_1$ and $R_2$ are tert-butyl groups. In a preferred embodiment, $R_3$ is a $C_1$-$C_4$ alkanediyl group. More preferably, $R_3$ is a methanediyl group. In a particularly preferred embodiment, the additive composition comprises 2,2'-methylene-bis-(4,6-di-tert-butylphenyl) phosphate anions.

The phosphate ester anion can be present in the additive composition of the first embodiment in any suitable amount. Preferably, the phosphate ester anions are present in the additive composition in an amount of about 2 mol. % or more of the total amount of phosphate ester anions and aromatic carboxylate anions present in the additive composition. The phosphate ester anions more preferably are present in the composition in an amount of about 5 mol. % or more, about 10 mol. % or more, or about 15 mol. % or more of the total amount of phosphate ester anions and aromatic carboxylate anions present in the additive composition. Preferably, the phosphate ester anions are present in the composition in an amount of about 90 mol. % or less of the total amount of phosphate ester anions and aromatic carboxylate anions present in the additive composition. The phosphate ester anions more preferably are present in the additive composition in an amount of about 85 mol. % or less, about 80 mol. % or less, about 75 mol. % or less, about 70 mol. % or less, about 65 mol. % or less, about 60 mol. % or less, about 55 mol. % or less, or about 50 mol. % or less of the total amount of phosphate ester anions and aromatic carboxylate anions present in the additive composition. Thus, in a series of preferred embodiment, the phosphate ester anions are present in the additive composition in an amount of about 2 mol. % to about 90 mol. %, about 5 mol. % to about 85 mol. %, about 10 mol. % to about 80 mol. %, about 15 mol. % to about 75 mol. %, about 15 mol. % to about 70 mol. %, about 15 mol. % to about 65 mol. %, about 15 mol. % to about 60 mol. %, about 15 mol. % to about 55 mol. %, or about 15 mol. % to about 50 mol. % of the total amount of phosphate ester anions and aromatic carboxylate anions present in the additive composition.

The additive composition of the first embodiment also comprises aromatic carboxylate anions. Suitable aromatic carboxylate anions include, but are not limited to, benzoate anions. The aromatic carboxylate anions can be present in the additive composition of the first embodiment in any suitable amount. Preferably, the aromatic carboxylate anions are present in the additive composition in an amount of about 10 mol. % or more of the total amount of phosphate ester anions and aromatic carboxylate anions present in the additive composition. More preferably, the aromatic carboxylate anions are present in the additive composition in an amount of about 20 mol. % or more, about 30 mol. % or more, about 40 mol. % or more, or about 50 mol. % or more of the total amount of phosphate ester anions and aromatic carboxylate anions present in the additive composition. Preferably, the aromatic carboxylate anions are present in the additive composition in an amount of about 98 mol. % or less of the total amount of phosphate ester anions and aromatic carboxylate anions present in the additive composition. More preferably, the aromatic carboxylate anions are present in the additive composition in an amount of about 95 mol. % or less, about 90 mol. % or less, or about 85 mol. % or less of the total amount of phosphate ester anions and aromatic carboxylate anions present in the additive composition. Thus, in a series of preferred embodiments, the aromatic carboxylate anions are present in the additive composition in an amount of about 10 mol. % to about 98 mol. %, about 20 mol. % to about 95 mol. %, about 30 mol. % to about 90 mol. %, about 40 mol. % to about 85 mol. %, or about 50 mol. % to about 85 mol. % of the total amount of phosphate ester anions and aromatic carboxylate anions present in the additive composition.

As noted above, the additive composition of the first embodiment comprises a combination of specified cations in addition to the enumerated anions. For example, the additive composition of the first embodiment comprises aluminum (III) cations. The additive composition can contain any suitable amount of aluminum (III) cations. Preferably, the aluminum (III) cations are present in the additive composition in an amount of about 1 mol. % or more of the total amount of aluminum (III) cations, sodium cations, lithium cations, and zinc (II) cations present in the additive composition. More preferably, the aluminum (III) cations are present in the additive composition in an amount of about 5 mol. % or more of the total amount of aluminum (III) cations, sodium cations, lithium cations, and zinc (II) cations present in the additive composition. In another preferred embodiment, the aluminum (III) cations are present in the additive composition in an amount of about 35 mol. % or less of the total amount of aluminum (III) cations, sodium cations, lithium cations, and zinc (II) cations present in the additive composition. More preferably, the aluminum (III) cations are present in the additive composition in an amount of about 30 mol. % or less, about 25 mol. % or less, about 20 mol. % or less, or about 15 mol. % or less of the total amount of aluminum (III) cations, sodium cations, lithium cations, and zinc (II) cations present in the additive composition. Thus, in a series of preferred embodiments, the aluminum (III) cations are present in the additive composition in an amount of about 1 mol. % to about 35 mol. %, about 5 mol. % to about 30 mol. %, about 5 mol. % to about 25 mol. %, about 5 mol. % to about 20 mol. %, or about 5 mol. % to about 15 mol. % of the total amount of aluminum (III) cations, sodium cations, lithium cations, and zinc (II) cations present in the additive composition.

The additive composition of the first embodiment additionally comprises sodium cations. The additive composition of the first embodiment can contain any suitable amount of sodium cations. Preferably, the sodium cations are present in the additive composition in an amount of about 10 mol. % or more of the total amount of aluminum (III) cations, sodium cations, lithium cations, and zinc (II) cations present in the additive composition. More preferably, the sodium cations are present in the additive composition in an amount of about 15 mol. % or more, about 20 mol. % or more, about 25 mol. % or more, about 30 mol. % or more, about 35 mol. % or more, about 40 mol. % or more, or about 45 mol. % or more of the total amount of aluminum (III) cations, sodium cations, lithium cations, and zinc (II) cations present in the additive composition. Preferably, the sodium cations are present in the additive composition in an amount of about 96 mol. % or less of the total amount of aluminum (III) cations, sodium cations, lithium cations, and zinc (II) cations present in the additive composition. More preferably, the sodium cations are present in the additive composition in an amount of about 95 mol. % or less, about 90 mol. % or less, about 85 mol. % or less, about 80 mol. % or less, about 75 mol. % or less, or about 70 mol. % or less of the total amount of aluminum (III) cations, sodium cations, lithium cations, and zinc (II) cations present in the additive composition. Thus, in a series of preferred embodiments, the sodium cations are present in the additive composition in an amount of about 10 mol. % to about 96 mol. %, about 15 mol. % to about 95 mol. %, about 20 mol. % to about 95 mol. %, about 25 mol. % to about 95 mol. %, about 30 mol. % to about 95 mol. %, about 35 mol. % to about 95 mol. %, about 40 mol. % to about 95 mol. %, about 45 mol. % to about 95 mol. % (e.g., about 45 mol. % to about 90 mol. %, about 45 mol. % to about 85 mol. %, about 45 mol. % to about 80 mol. %, about 45 mol. % to about 75 mol. %, or about 45 mol. % to about 70 mol. %) of the total amount of aluminum (III) cations, sodium cations, lithium cations, and zinc (II) cations present in the additive composition.

The additive composition of the first embodiment optionally comprises lithium cations. When present, the lithium cations can be present in the additive composition of the first embodiment in any suitable amount. The lithium cations, when present, preferably are present in the additive composition in an amount of about 0.1 mol. % or more, about 1 mol. % or more, about 5 mol. % or more, or about 10 mol. % of the total amount of aluminum (III) cations, sodium cations, lithium cations, and zinc (II) cations present in the additive composition. The lithium cations, when present, preferably are present in the additive composition in an amount of about 60 mol. % or less of the total amount of aluminum (III) cations, sodium cations, lithium cations, and zinc (II) cations present in the additive composition. More preferably, the lithium cations, when present, are present in the additive composition in an amount of about 55 mol. % or less, about 50 mol. % or less, about 45 mol. % or less, about 40 mol. % or less, about 35 mol. % or less, about 30 mol. % or less, about 25 mol. % or less, or about 20 mol. % or less of the total amount of aluminum (III) cations, sodium cations, lithium cations, and zinc (II) cations present in the additive composition. Thus, in a series of preferred embodiments, the lithium cations, when present, are present in the additive composition in an amount of about 0.1 mol. % to about 60 mol. % (e.g., about 1 mol. % to about 60 mol. %), about 5 mol. % to about 55 mol. %, about 10 mol. % to about 50 mol. %, about 10 mol. % to about 45 mol. %, or about 10 mol. % to about 40 mol. % (e.g., about 10 mol. % to about 35 mol. %, about 10 mol. % to about 30 mol. %, about 10 mol. % to about 25 mol. %, about 10 mol. % to about 20 mol. %, or about 15 mol. % to about 20 mol. %) of the total amount of aluminum (III) cations, sodium cations, lithium cations, and zinc (II) cations present in the additive composition.

The additive composition of the first embodiment optionally comprises zinc (II) cations. When present, the zinc (II) cations can be present in the additive composition of the first embodiment in any suitable amount. The zinc (II) cations, when present, preferably are present in the additive composition in an amount of about 0.1 mol. % or more of the total amount of aluminum (III) cations, sodium cations, lithium cations, and zinc (II) cations present in the additive composition. In another preferred embodiment, the zinc (II) cations, when present, are present in the additive composition in an amount of about 20 mol. % or less of the total amount of aluminum (III) cations, sodium cations, lithium cations, and zinc (II) cations present in the additive composition. More preferably, the zinc (II) cations, when present, are present in the additive composition in an amount of about 15 mol. % or less, about 10 mol. % or less, or about 5 mol. % or less of the total amount of aluminum (III) cations, sodium cations, lithium cations, and zinc (II) cations present in the additive composition. Thus, in a series of preferred embodiments, the zinc (II) cations, when present, are present in the additive composition in an amount of about 0.1 mol. % to about 20 mol. %, about 0.1 mol. % to about 15 mol. %, about 0.1 mol. % to about 10 mol. %, or about 0.1 mol. % to about 5 mol. % of the total amount of aluminum (III) cations, sodium cations, lithium cations, and zinc (II) cations present in the additive composition.

As noted above, the additive composition of the first embodiment comprises at least one fatty acid salt. Suitable fatty acid salts include, but are not limited to, the alkali metal, alkaline earth metal, and zinc (II) salts of saturated and unsaturated fatty acids (e.g., $C_6$ or greater fatty acids) and esters of such saturated and unsaturated fatty acids (e.g., lactic acid or poly(lactic acid) esters). In a preferred embodiment, the fatty acid salt is selected from the group consisting of alkali metal, alkaline earth metal, and zinc (II) salts of saturated fatty acids, more preferably $C_6$ or greater saturated fatty acids and even more preferably $C_{10}$ or greater saturated fatty acids. In a more specific preferred embodiment, the additive composition of the first embodiment comprises at least one fatty acid salt selected from the group consisting of laurate salts, myristate salts, palmitate salts, stearate salts (e.g., 12-hydroxystearate salts), arachidate (eicosanoate) salts, behenate salts, lactylate salts, and mixtures thereof. In a preferred embodiment, the additive composition of the first embodiment comprises at least one fatty acid salt selected from the group consisting of myristate salts, palmitate salts, stearate salts, and mixtures thereof. In another preferred embodiment, the additive composition comprises a fatty acid salt selected from the group consisting of myristate salts, stearate salts, and mixtures thereof. The fatty acids salts described above typically are derived from natural sources and, therefore, contain a mixture of fatty acid salts having different carbon chain lengths. For example, a product sold as a stearate salt can contain appreciable amounts of palmitate salts and/or arachidate salts. Further, the distribution of different fatty acid salts within the product can vary depending upon the particular source used to produce the product. Thus, as used in this application, a reference to a particular fatty acid salt is not intended to solely encompass the pure fatty acid salt. Rather, a reference to a particular fatty acid also encompasses products commercially sold as that particular fatty acid salt, even if such products also contain measurable amounts of fatty acid salts having similar carbon chain lengths.

The fatty acid salt can be present in the additive composition of the first embodiment in any suitable amount. Preferably, the additive composition of the first embodiment contains 5 wt. % or more fatty acid salts, based on the total weight of the additive composition. In another embodiment, the additive composition of the first embodiment preferably contains about 10 wt. % or more, about 15 wt. % or more, or about 20 wt. % or more, or about 25 wt. % or more fatty acid salts. The additive composition of the first embodiment preferably comprises about 70 wt. % or less, about 65 wt. % or less, about 60 wt. % or less, or about 55 wt. % or less fatty acid salts. Thus, in a series of preferred embodiments, the additive composition of the first embodiment contains 5 wt. % to about 70 wt. %, about 10 wt. % to about 65 wt. %, about 15 wt. % to about 60 wt. %, about 20 wt. % to about 55 wt. %, or about 25 wt. % to about 55 wt. % fatty acid salts.

In a second embodiment, the invention provides an additive composition comprising phosphate ester anions, aromatic carboxylate anions, cycloaliphatic dicarboxylate anions, aluminum (III) cations, sodium cations, and at least one fatty acid salt. The additive composition of the second embodiment can optionally comprise calcium cations, lithium cations, and/or zinc (II) cations. The anions are present in specified molar percentages, and the cations are present in specified molar percentages. The specified anions present in the additive composition are contributed by one or more phosphate ester salts, one or more aromatic carboxylate salts, and one or more cycloaliphatic dicarboxylate salts present in the additive composition. The specified cations present in the additive composition are also contributed by the phosphate ester salt(s), the aromatic carboxylate salt(s), and the cycloaliphatic dicarboxylate salt(s) present in the additive composition, but a portion of the cations are also contributed by the fatty acid salt(s) present in the additive composition.

The additive composition of the second embodiment comprises phosphate ester anions. Preferably, the phosphate ester anions conform to the structure of Formula (I) below (I)

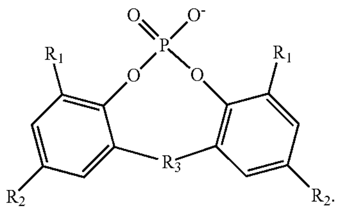

In the structure of Formula (I), $R_1$ and $R_2$ are independently selected from the group consisting of hydrogen and $C_1$-$C_{18}$ alkyl groups, and $R_3$ is an alkanediyl group. In a preferred embodiment, $R_1$ and $R_2$ are selected from the group consisting of hydrogen and $C_1$-$C_4$ alkyl groups. More preferably, $R_1$ and $R_2$ are tert-butyl groups. In a preferred embodiment, $R_3$ is a $C_1$-$C_4$ alkanediyl group. More preferably, $R_3$ is a methanediyl group. In a particularly preferred embodiment, the additive composition comprises 2,2'-methylene-bis-(4,6-di-tert-butylphenyl) phosphate anions.

The phosphate ester anion can be present in the additive composition of the second embodiment in any suitable amount. Preferably, the phosphate ester anions are present in the additive composition in an amount of about 1.5 mol. % or more of the total amount of phosphate ester anions, aromatic carboxylate anions, and cycloaliphatic dicarboxylate anions present in the additive composition. The phosphate ester anions more preferably are present in the composition in an amount of about 5 mol. % or more, about 10 mol. % or more, about 15 mol. % or more, or about 20 mol. % or more of the total amount of phosphate ester anions, aromatic carboxylate anions, and cycloaliphatic dicarboxylate anions present in the additive composition. Preferably, the phosphate ester anions are present in the composition in an amount of about 45 mol. % or less of the total amount of phosphate ester anions, aromatic carboxylate anions, and cycloaliphatic dicarboxylate anions present in the additive composition. The phosphate ester anions more preferably are present in the additive composition in an amount of about 40 mol. % or less, about 35 mol. % or less, or about 30 mol. % or less of the total amount of phosphate ester anions, aromatic carboxylate anions, and cycloaliphatic dicarboxylate anions present in the additive composition. Thus, in a series of preferred embodiment, the phosphate ester anions are present in the additive composition in an amount of about 1.5 mol. % to about 45 mol. %, about 5 mol. % to about 40 mol. %, about 10 mol. % to about 40 mol. %, about 15 mol. % to about 40 mol. %, about 20 mol. % to about 40 mol. % (e.g., about 20 mol. % to about 35 mol. % or about 20 mol. % to about 30 mol. %) of the total amount of phosphate ester anions, aromatic carboxylate anions, and cycloaliphatic dicarboxylate anions present in the additive composition.

The additive composition of the second embodiment also comprises aromatic carboxylate anions. Suitable aromatic carboxylate anions include, but are not limited to, benzoate anions. The aromatic carboxylate anions can be present in the additive composition of the second embodiment in any suitable amount. Preferably, the aromatic carboxylate anions are present in the additive composition in an amount of about 5 mol. % or more of the total amount of phosphate ester anions, aromatic carboxylate anions, and cycloaliphatic dicarboxylate anions present in the additive composition. More preferably, the aromatic carboxylate anions are present in the additive composition in an amount of about 10 mol. % or more, about 15 mol. % or more, or about 20 mol. % or more of the total amount of phosphate ester anions, aromatic carboxylate anions, and cycloaliphatic dicarboxylate anions present in the additive composition. Preferably, the aromatic carboxylate anions are present in the additive composition in an amount of about 80 mol. % or less of the total amount of phosphate ester anions, aromatic carboxylate anions, and cycloaliphatic dicarboxylate anions present in the additive composition. More preferably, the aromatic carboxylate anions are present in the additive composition in an amount of about 75 mol. % or less, about 70 mol. % or less, about 65 mol. % or less, about 60 mol. % or less, about 55 mol. % or less, about 50 mol. % or less, about 45 mol. % or less, or about 40 mol. % or less of the total amount of phosphate ester anions, aromatic carboxylate anions, and cycloaliphatic dicarboxylate anions present in the additive composition. Thus, in a series of preferred embodiments, the aromatic carboxylate anions are present in the additive composition in an amount of about 5 mol. % to about 80 mol. %, about 10 mol. % to about 75 mol. %, about 15 mol. % to about 70 mol. %, about 20 mol. % to about 65 mol. %, about 20 mol. % to about 60 mol. %, about 20 mol. % to about 55 mol. %, or about 20 mol. % to about 50 mol. % of the total amount of phosphate ester anions, aromatic carboxylate anions, and cycloaliphatic dicarboxylate anions present in the additive composition.

The additive composition of the second embodiment also comprises cycloaliphatic dicarboxylate anions. Preferably, the cycloaliphatic dicarboxylate anions conform to a structure selected from the group consisting of Formula (X) and Formula (XX) below. The structure of Formula (X) is:

(X)

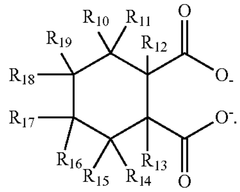

In the structure of Formula (X), $R_{10}$, $R_{11}$, $R_{12}$, $R_{13}$, $R_{14}$, $R_{15}$, $R_{16}$, $R_{17}$, $R_{18}$, and $R_{19}$ are independently selected from the group consisting of hydrogen, halogens, $C_1$-$C_9$ alkyl groups, $C_1$-$C_9$ alkoxy groups, and $C_1$-$C_9$ alkylamine groups. Preferably, $R_{10}$, $R_{11}$, $R_{12}$, $R_{13}$, $R_{14}$, $R_{15}$, $R_{16}$, $R_{17}$, $R_{18}$, and $R_{19}$ are each hydrogen. The two carboxylate moieties can be arranged in either the cis or the trans configuration. Preferably, the two carboxylate moieties are arranged in the cis configuration. In a specific preferred embodiment, $R_{10}$, $R_{11}$, $R_{12}$, $R_{13}$, $R_{14}$, $R_{15}$, $R_{16}$, $R_{17}$, $R_{18}$, and $R_{19}$ are each hydrogen, and the two carboxylate moieties are arranged in the cis configuration. The structure of Formula (XX) is:

(XX)

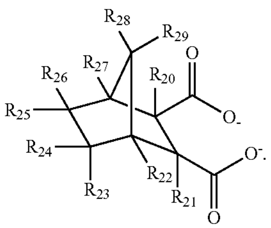

In the structure of Formula (XX), $R_{20}$, $R_{21}$, $R_{22}$, $R_{23}$, $R_{24}$, $R_{25}$, $R_{26}$, $R_{27}$, $R_{28}$, and $R_{29}$ are independently selected from the group consisting of hydrogen, halogens, $C_1$-$C_9$ alkyl groups, $C_1$-$C_9$ alkoxy groups, and $C_1$-$C_9$ alkylamine groups. In a preferred embodiment, $R_{20}$, $R_{21}$, $R_{22}$, $R_{23}$, $R_{24}$, $R_{25}$, $R_{26}$, $R_{27}$, $R_{28}$, and $R_{29}$ are each hydrogen. The two carboxylate moieties can be arranged in either the cis or the trans configuration. Preferably, the two carboxylate moieties are arranged in the cis configuration. When arranged in the cis configuration, the two carboxylate moieties can be arranged in either the endo or exo configuration relative to the bicyclic portion of the compound. When the two carboxylate moieties are arranged in the cis configuration, the moieties preferably are arranged in the cis-endo configuration. In a preferred embodiment, additive composition of the second embodiment comprises cycloaliphatic dicarboxylate anions conforming to the structure of Formula (XX). More preferably, the cycloaliphatic dicarboxylate anions conform to the structure of Formula (XX) in which $R_{20}$, $R_{21}$, $R_{22}$, $R_{23}$, $R_{24}$, $R_{25}$, $R_{26}$, $R_{27}$, $R_{28}$, and $R_{29}$ are each hydrogen, and the two carboxylate moieties are arranged in the cis-endo configuration.

The cycloaliphatic dicarboxylate anions can be present in the additive composition of the second embodiment in any suitable amount. Preferably, the cycloaliphatic dicarboxylate anions are present in the additive composition in an amount of about 3 mol. % or more of the total amount of phosphate ester anions, aromatic carboxylate anions, and cycloaliphatic dicarboxylate anions present in the additive composition. More preferably, the cycloaliphatic dicarboxylate anions are present in the additive composition in an amount of about 5 mol. % or more or about 10 mol. % or more of the total amount of phosphate ester anions, aromatic carboxylate anions, and cycloaliphatic dicarboxylate anions present in the additive composition. Preferably, the cycloaliphatic dicarboxylate anions are present in the additive composition in an amount of about 55 mol. % or less of the total amount of phosphate ester anions, aromatic carboxylate anions, and cycloaliphatic dicarboxylate anions present in the additive composition. More preferably, the cycloaliphatic dicarboxylate anions are present in the additive composition in an amount of about 50 mol. % or less, or about 45 mol. % or less of the total amount of phosphate ester anions, aromatic carboxylate anions, and cycloaliphatic dicarboxylate anions present in the additive composition. Thus, in a series of preferred embodiments, the cycloaliphatic dicarboxylate anions are present in the additive composition in an amount of about 3 mol. % to about 55 mol. %, about 5 mol. % to about 50 mol. %, about 10 mol. % to about 50 mol. %, or about 10 mol. % to about 45 mol. % of the total amount of phosphate ester anions, aromatic carboxylate anions, and cycloaliphatic dicarboxylate anions present in the additive composition.

As noted above, the additive composition of the second embodiment comprises a combination of specified cations in addition to the enumerated anions. For example, the additive composition of the second embodiment comprises aluminum (III) cations. The additive composition can contain any suitable amount of aluminum (III) cations. Preferably, the aluminum (III) cations are present in the additive composition in an amount of about 0.5 mol. % or more of the total amount of aluminum (III) cations, sodium cations, calcium cations, lithium cations, and zinc (II) cations present in the additive composition. More preferably, the aluminum (III) cations are present in the additive composition in an amount of about 1 mol. % or more, about 2 mol. % or more, about 3 mol. % or more, about 4 mol. % or more, or about 5 mol. % or more of the total amount of aluminum (III) cations, sodium cations, calcium cations, lithium cations, and zinc (II) cations present in the additive composition. In another preferred embodiment, the aluminum (III) cations are present in the additive composition in an amount of about 20 mol. % or less of the total amount of aluminum (III) cations, sodium cations, calcium cations, lithium cations, and zinc (II) cations present in the additive composition. More preferably, the aluminum (III) cations are present in the additive composition in an amount of about 15 mol. % or less of the total amount of aluminum (III) cations, sodium cations, calcium cations, lithium cations, and zinc (II) cations present in the additive composition. Thus, in a series of preferred embodiments, the aluminum (III) cations are present in the additive composition in an amount of about 0.5 mol. % to about 20 mol. %, about 1 mol. % to about 20 mol. %, about 5 mol. % to about 20 mol. %, or about 5 mol. % to about 15 mol. % of the total amount of aluminum (III) cations, sodium cations, calcium cations, lithium cations, and zinc (II) cations present in the additive composition.

The additive composition of the second embodiment additionally comprises sodium cations. The additive composition of the second embodiment can contain any suitable amount of sodium cations. Preferably, the sodium cations are present in the additive composition in an amount of about 30 mol. % or more of the total amount of aluminum (III) cations, sodium cations, calcium cations, lithium cations, and zinc (II) cations present in the additive composition. More preferably, the sodium cations are present in the additive composition in an amount of about 40 mol. % or more, about 45 mol. % or more, about 50 mol. % or more, about 55 mol. % or more, about 60 mol. % or more, about 65 mol. % or more, or about 70 mol. % or more of the total amount of aluminum (III) cations, sodium cations, calcium cations, lithium cations, and zinc (II) cations present in the additive composition. Preferably, the sodium cations are present in the additive composition in an amount of about 95 mol. % or less of the total amount of aluminum (III) cations, sodium cations, calcium cations, lithium cations, and zinc (II) cations present in the additive composition. More preferably, the sodium cations are present in the additive composition in an amount of about 90 mol. % or less of the total amount of aluminum (III) cations, sodium cations, calcium cations, lithium cations, and zinc (II) cations present in the additive composition. Thus, in a series of preferred embodiments, the sodium cations are present in the additive composition in an amount of about 30 mol. % to about 95 mol. % (e.g., about 30 mol. % to about 90 mol. %), about 40 mol. % to about 90 mol. %, about 45 mol. % to about 90 mol. %, about 50 mol. % to about 90 mol. %, about 55 mol. % to about 90 mol. %, about 60 mol. % to about 90 mol. %, about 65 mol. % to about 90 mol. %, about 70 mol. % to about 90 mol. % of the total amount of aluminum (III) cations, sodium cations, calcium cations, lithium cations, and zinc (II) cations present in the additive composition.

The additive composition of the second embodiment optionally comprises calcium cations. When present, the calcium cations can be present in the additive composition of the second embodiment in any suitable amount. The calcium cations, when present, preferably are present in the additive composition in an amount of about 0.5 mol. % or more, about 1 mol. % or more, about 2 mol. % or more, about 3 mol. % or more, about 4 mol. % or more, or about 5 mol. % or more of the total amount of aluminum (III) cations, sodium cations, calcium cations, lithium cations, and zinc (II) cations present in the additive composition. The calcium cations, when present, preferably are present in the additive composition in an amount of about 35 mol. % or less of the total amount of aluminum (III) cations, sodium cations, calcium cations, lithium cations, and zinc (II) cations present in the additive composition. More preferably, the calcium cations, when present, are present in the additive composition in an amount of about 30 mol. % or less, about 25 mol. % or less, about 20 mol. % or less, or about 15 mol. % or less of the total amount of aluminum (III) cations, sodium cations, calcium cations, lithium cations, and zinc (II) cations present in the additive composition. Thus, in a series of preferred embodiments, the calcium cation, when present, are present in the additive composition in an amount of about 0.5 mol. % to about 35 mol. %, about 1 mol. % to about 30 mol. %, about 2 mol. % to about 25 mol. %, about 3 mol. % to about 20 mol. %, about 4 mol. % to about 15 mol. %, or about 5 mol. % to about 15 mol. % of the total amount of aluminum (III) cations, sodium cations, calcium cations, lithium cations, and zinc (II) cations present in the additive composition.

The additive composition of the second embodiment optionally comprises lithium cations. When present, the lithium cations can be present in the additive composition of the second embodiment in any suitable amount. The lithium cations, when present, preferably are present in the additive composition in an amount of about 0.5 mol. % or more, about 1 mol. % or more, about 2 mol. % or more, or about 3 mol. % of the total amount of aluminum (III) cations, sodium cations, calcium cations, lithium cations, and zinc (II) cations present in the additive composition. The lithium cations, when present, preferably are present in the additive composition in an amount of about 30 mol. % or less of the total amount of aluminum (III) cations, sodium cations, calcium cations, lithium cations, and zinc (II) cations present in the additive composition. More preferably, the lithium cations, when present, are present in the additive composition in an amount of about 25 mol. % or less, about 20 mol. % or less, or about 15 mol. % or less of the total amount of aluminum (III) cations, sodium cations, calcium cations, lithium cations, and zinc (II) cations present in the additive composition. Thus, in a series of preferred embodiments, the lithium cations, when present, are present in the additive composition in an amount of about 0.5 mol. % to about 30 mol. % (e.g., about 1 mol. % to about 30 mol. %), about 1 mol. % to about 25 mol. %, about 2 mol. % to about 20 mol. %, or about 3 mol. % to about 15 mol. % of the total amount of aluminum (III) cations, sodium cations, calcium cations, lithium cations, and zinc (II) cations present in the additive composition.

The additive composition of the second embodiment optionally comprises zinc (II) cations. When present, the zinc (II) cations can be present in the additive composition of the second embodiment in any suitable amount. The zinc (II) cations, when present, preferably are present in the additive composition in an amount of about 0.1 mol. % or more of the total amount of aluminum (III) cations, sodium cations, calcium cations, lithium cations, and zinc (II) cations present in the additive composition. More preferably, the zinc (II) cations are present in the additive composition in an amount of about 1 mol. % or more of the total amount of aluminum (III) cations, sodium cations, calcium cations, lithium cations, and zinc (II) cations present in the additive composition. In another preferred embodiment, the zinc (II) cations, when present, are present in the additive composition in an amount of about 15 mol. % or less of the total amount of aluminum (III) cations, sodium cations, calcium cations, lithium cations, and zinc (II) cations present in the additive composition. More preferably, the zinc (II) cations, when present, are present in the additive composition in an amount of about 10 mol. % or less of the total amount of aluminum (III) cations, sodium cations, calcium cations, lithium cations, and zinc (II) cations present in the additive composition. Thus, in a series of preferred embodiments, the zinc (II) cations, when present, are present in the additive composition in an amount of about 0.1 mol. % to about 15 mol. %, about 1 mol. % to about 15 mol. %, or about 1 mol. % to about 10 mol. % of the total amount of aluminum (III) cations, sodium cations, calcium cations, lithium cations, and zinc (II) cations present in the additive composition.

As noted above, the additive composition of the second embodiment comprises at least one fatty acid salt. Suitable fatty acid salts include, but are not limited to, the alkali metal, alkaline earth metal, and zinc (II) salts of saturated and unsaturated fatty acids (e.g., $C_6$ or greater fatty acids) and esters of such saturated and unsaturated fatty acids (e.g., lactic acid or poly(lactic acid) esters). In a preferred embodiment, the fatty acid salt is selected from the group consisting of alkali metal, alkaline earth metal, and zinc (II) salts of saturated fatty acids, more preferably $C_6$ or greater saturated fatty acids and even more preferably $C_{10}$ or greater saturated fatty acids. In a more specific preferred embodiment, the additive composition of the second embodiment comprises at least one fatty acid salt selected from the group consisting of laurate salts, myristate salts, palmitate salts, stearate salts (e.g., 12-hydroxystearate salts), arachidate (eicosanoate) salts, behenate salts, lactylate salts, and mixtures thereof. In a preferred embodiment, the additive composition of the second embodiment comprises at least one fatty acid salt selected from the group consisting of myristate salts, palmitate salts, stearate salts, and mixtures thereof. More preferably, the additive composition of the second embodiment comprises at least one fatty acid selected from the group consisting of myristate salts, stearate salts, and mixtures thereof.

The fatty acid salt can be present in the additive composition of the second embodiment in any suitable amount. Preferably, the additive composition of the second embodiment contains 5 wt. % or more fatty acid salts, based on the total weight of the additive composition. In another embodiment, the additive composition of the first embodiment preferably contains about 10 wt. % or more, about 15 wt. % or more, or about 20 wt. % or more fatty acid salts. The additive composition of the first embodiment preferably comprises about 60 wt. % or less, about 55 wt. % or less, about 50 wt. % or less, or about 45 wt. % or less fatty acid salts. Thus, in a series of preferred embodiments, the additive composition of the first embodiment contains 5 wt. % to about 60 wt. %, about 10 wt. % to about 55 wt. %, about 15 wt. % to about 50 wt. %, about 15 wt. % to about 45 wt. %, or about 20 wt. % to about 45 wt. % fatty acid salts.

As noted above, the additive compositions of the invention are particularly useful in the nucleation of polyolefins, such as polypropylene polymers. Thus, in another series of embodiments, the invention provides a polymer composition comprising a polymer and an additive composition as described herein. The polymer composition can comprise any suitable polymer. Preferably, the polymer is a thermoplastic polymer. More preferably, the thermoplastic polymer is a polyolefin. The polyolefin polymer can be any suitable polyolefin, such as a polypropylene, a polyethylene, a polybutylene, a poly(4-methyl-1-pentene), and a poly(vinyl cyclohexane). In a preferred embodiment, the thermoplastic polymer is a polyolefin selected from the group consisting of polypropylene homopolymers (e.g., atactic polypropylene homopolymer, isotactic polypropylene homopolymer, and syndiotactic polypropylene homopolymer), polypropylene copolymers (e.g., polypropylene random copolymers), polypropylene impact copolymers, and mixtures thereof. Suitable polypropylene copolymers include, but are not limited to, random copolymers made from the polymerization of propylene in the presence of a comonomer selected from the group consisting of ethylene, but-1-ene (i.e., 1-butene), and hex-1-ene (i.e., 1-hexene). In such polypropylene random copolymers, the comonomer can be present in any suitable amount, but typically is present in an amount of less than about 10 wt. % (e.g., about 1 to about 7 wt. %). Suitable polypropylene impact copolymers include, but are not limited to, those produced by the addition of a copolymer selected from the group consisting of ethylene-propylene rubber (EPR), ethylenepropylene-diene monomer (EPDM), polyethylene, and plastomers to a polypropylene homopolymer or polypropylene random copolymer. In such polypropylene impact copolymers, the copolymer can be present in any suitable amount, but typically is present in an amount of from about 5 to about 25 wt. %. The polyolefin polymers described above can be branched or cross-linked, such as the branching or cross-linking that results from the addition of additives that increase the melt strength of the polymer.

The polymer composition can comprise any suitable amount of the additive composition. Preferably, the additive composition is present in the polymer composition in an amount of about 50 ppm or more, based on the total weight of the polymer composition. More preferably, the additive composition is present in the polymer composition in an amount of about 100 ppm or more, about 200 ppm or more, about 300 ppm or more, about 400 ppm or more, or about 500 ppm or more, based on the total weight of the polymer composition. In another preferred embodiment, the additive composition is present in the polymer composition in an amount of about 10,000 ppm or less, based on the total weight of the polymer composition. More preferably, the additive composition is present in the polymer composition in an amount of about 9,000 ppm or less, about 8,000 ppm or less, about 7,000 ppm or less, about 6,000 ppm or less, about 5,000 ppm or less, about 4,000 ppm or less, about 3,000 ppm or less, or about 2,500 ppm or less, based on the total weight of the polymer composition. Thus, in a series of preferred embodiments, the additive composition is present in the polymer composition in an amount of about 50 ppm to about 10,000 ppm (e.g., about 100 ppm to about 10,000 ppm), about 50 ppm to about 5,000 ppm, about 100 ppm to about 5,000 ppm, about 500 ppm to about 5,000 ppm, based on the total weight of the polymer composition.

In another embodiment, the polymer composition can be a masterbatch composition, which comprises a relatively high amount of the additive composition. In such a masterbatch embodiment, the additive composition can be present in the polymer composition in any suitable amount. In one embodiment, the additive composition preferably is present in the polymer composition in an amount of about 1 wt. % or more, based on the total weight of the polymer composition. More preferably, the additive composition is present in the polymer composition in an amount of about 2 wt. % or more, about 3 wt. % or more, about 4 wt. % or more, or about 5 wt. % or more, based on the total weight of the polymer composition. In such a masterbatch composition, the additive composition preferably is present in the polymer composition in an amount of about 50 wt. % or less, about 40 wt. % or less, about 30 wt. % or less, about 20 wt. % or less, about 15 wt. % or less, or about 10 wt. % or less, based on the total weight of the polymer composition. Thus, in a series of preferred embodiments of such a masterbatch composition, the additive composition is present in the polymer composition in an amount of about 1 wt. % to about 50 wt. % (e.g., about 1 wt. % to about 40 wt. %, about 1 wt. % to about 30 wt. %, about 1 wt. % to about 20 wt. %, about 1 wt. % to about 15 wt. %, or about 1 wt. % to about 10 wt. %), 2 wt. % to about 50 wt. % (e.g., about 2 wt. % to about 40 wt. %, about 2 wt. % to about 30 wt. %, about 2 wt. % to about 20 wt. %, about 2 wt. % to about 15 wt. %, or about 2 wt. % to about 10 wt. %), 3 wt. % to about 50 wt. % (e.g., about 3 wt. % to about 40 wt. %, about 3 wt. % to about 30 wt. %, about 3 wt. % to about 20 wt. %, about 3 wt. % to about 15 wt. %, or about 3 wt. % to about 10 wt. %), 4 wt. % to about 50 wt. % (e.g., about 4 wt. % to about 40 wt. %, about 4 wt. % to about 30 wt. %, about 4 wt. % to about 20 wt. %, about 4 wt. % to about 15 wt. %, or about 4 wt. % to about 10 wt. %), or 5 wt. % to about 50 wt. % (e.g., about 5 wt. % to about 40 wt. %, about 5 wt. % to about 30 wt. %, about 5 wt. % to about 20 wt. %, about 5 wt. % to about 15 wt. %, or about 5 wt. % to about 10 wt. %), based on the total weight of the polymer composition.

The polymer compositions described above can contain other polymer additives in addition to those contained in the additive composition. Suitable additional polymer additives include, but are not limited to, antioxidants (e.g., phenolic antioxidants, phosphite antioxidants, and combinations thereof), anti-blocking agents (e.g., amorphous silica and diatomaceous earth), pigments (e.g., organic pigments and inorganic pigments) and other colorants (e.g., dyes and polymeric colorants), fillers and reinforcing agents (e.g., glass, glass fibers, talc, calcium carbonate, and magnesium oxysulfate whiskers), nucleating agents, clarifying agents, acid scavengers (e.g., hydrotalcite-like acid scavengers [e.g., DHT-4A® from Kisuma Chemicals], metal salts of fatty acids [e.g., the metal salts of stearic acid], and metals salts of fatty acid esters [e.g., lactylate salts]), polymer processing additives (e.g., fluoropolymer polymer processing additives), polymer cross-linking agents, slip agents (e.g., fatty acid amide compounds derived from the reaction between a fatty acid and ammonia or an amine-containing compound), fatty acid ester compounds (e.g., fatty acid ester compounds derived from the reaction between a fatty acid and a hydroxyl-containing compound, such as glycerol, diglycerol, and combinations thereof), and combinations of the foregoing.

The polymer compositions described herein have been observed to exhibit a combination of desirable physical properties. For example, polymer compositions according to the invention (e.g., polypropylene homopolymer compositions) can exhibit crystallization temperatures in excess of 130° C., which is high enough to significantly shorten cycle times in molding operations. These polymer compositions also exhibit relatively high stiffness relative to polymer compositions nucleated with alternative nucleating agents. Additionally, polypropylene impact copolymer compositions according to the exhibit markedly increased stiffness and thermal stability relative to polymer compositions nucleated with alternative nucleating agents. For example, such polymer compositions of the invention exhibit a marked increase in heat deflection temperature, meaning that the polymer compositions are more suited for use in applications where they will be exposed to high temperatures and must retain their stiffness.

The polymer composition described herein is believed to be useful in producing thermoplastic articles. The polymer composition can be formed into the desired thermoplastic article by any suitable technique, such as injection molding, injection rotational molding, blow molding (e.g., injection blow molding or injection stretch blow molding), extrusion (e.g., sheet extrusion, film extrusion, cast film extrusion, or foam extrusion), extrusion blow molding, thermoforming, rotomolding, film blowing (blown film), film casting (cast film), and the like.

The polymer composition described herein can be used to produce any suitable article or product. Suitable products include, but are not limited to, medical devices (e.g., pre-filled syringes for retort applications, intravenous supply containers, and blood collection apparatus), food packaging, liquid containers (e.g., containers for drinks, medications, personal care compositions, shampoos, and the like), apparel cases, microwavable articles, shelving, cabinet doors, mechanical parts, automobile parts, sheets, pipes, tubes, rotationally molded parts, blow molded parts, films, fibers, and the like.

The following examples further illustrate the subject matter described above but, of course, should not be construed as in any way limiting the scope thereof.

EXAMPLE 1

The following examples demonstrates the production of polymer compositions according to the invention. The example further describes certain physical properties exhibited by the polymer compositions.

Fourteen polymer compositions (Samples 1A-1N) were produced with additive compositions as described in Table 1 below. The polymer compositions were produced by individually adding the necessary salts to the polymer. In the table, "PE" denotes the 2,2'-methylene-bis-(4,6-di-tert-butylphenyl) phosphate anion, and "AC" denotes the benzoate anion, except for Sample 1J in which the anion is the 4-tert-butylbenzoate anion. The mole percentage (mol. %) of anions reported in the table is the mole percentage of the total amount of phosphate ester anions and aromatic carboxylate anions present in the additive composition. The mole percentage (mol. %) of cations reported in the table is the mole percentage of the total amount of sodium cations, aluminum (III) cations, lithium cations, and zinc (II) cations present in the additive composition. Sample 1E was 100% calcium stearate. Each polymer composition contained a 26 MFR polypropylene impact copolymer (Prime Polymer J707P), 500 ppm Irganox® 1010 (primary antioxidant), and 1000 ppm Irgafos® 168 (secondary antioxidant). The polymer compositions were compounded on a Leistritz twin screw extruder. The barrel temperature of the extruder was ramped from 160 to 190° C., and the screw speed was set at approximately 450 rpm. Sample bars were formed from each polymer composition by injection molding on an Arburg 40 ton injection molder. The molder was set at a temperature ranging between 190 and 260° C. The injection speed was 14 cc/sec. The sample bars had dimensions of 80 mm×10 mm×4 mm.

TABLE 1

Composition of Samples 1A-1N.

| | Anions (mol. %) | | Cations (mol. %) | | | | Fatty acid (wt. % of | Fatty acid (ppm in |
|---|---|---|---|---|---|---|---|---|
| Sample | PE | AC | Na | Al(III) | Li | Zn(II) | additive) | polymer) |
| 1A | 46.8 | 53.2 | 49.5 | 10.8 | 38.2 | 1.5 | 51.95 | 779.3 |
| 1B | 31.9 | 68.1 | 68.2 | 12.9 | 18.9 | 0.0 | 27.04 | 405.6 |
| 1C | 16.9 | 83.1 | 81.0 | 7.0 | 12.1 | 0.0 | 26.44 | 396.6 |
| 1D | 22.1 | 77.9 | 91.2 | 8.8 | 0.0 | 0.0 | 30.83 | 1850.0 |
| 1E | 0 | 0 | 0 | 0 | 0 | 0 | 100 | 400 |
| 1F | 100 | 0 | 0 | 22 | 78 | 0 | 43.67 | 655 |
| 1G | 100 | 0 | 100 | 0 | 0 | 0 | 0 | 0 |
| 1H | 0 | 100 | 100 | 0 | 0 | 0 | 0 | 0 |
| 1I | 100 | 0 | 0 | 100 | 0 | 0 | 0 | 0 |
| 1J | 0.0 | 100.0 | 0.0 | 100 | 0.0 | 0 | 0 | 0 |
| 1K | 1.5 | 98.5 | 58.5 | 0.3 | 34.1 | 7.1 | 72.14 | 580.6 |
| 1L | 100 | 0 | 0 | 55 | 0 | 45 | 30.27 | 605.5 |
| 1M | 85.0 | 15.0 | 29.9 | 57.6 | 12.5 | 0.0 | 8.24 | 94.8 |
| 1N | 100.0 | 0.0 | 0.0 | 61.0 | 30.1 | 8.9 | 15.95 | 189.4 |

The flexural properties of the polymer composition were measured using the ISO 178 standard method. Measurements were carried out at a speed of 2 mm/minute on a 64 mm support span, and support span to specimen depth ratio of 16:1. The reported values are the average of five measurements taken after the sample bars were annealed at room temperature for 4 days. The heat deflection temperature of the polymer compositions was measured using the ISO 75 standard method. The reported values are the average of five measurements taken after the sample bars were annealed at room temperature for 4 days. Table 2 sets forth the results of the flexural and heat deflection temperature tests.

TABLE 2

Flexural modulus and heat deflection temperature (HDT) for Samples 1A-1N.

| Sample | Chord Flexural Modulus (MPa) | HDT at 0.455 MPa (° C.) |
|---|---|---|
| 1A | 1591 | 114.8 |
| 1B | 1612 | 117.0 |
| 1C | 1573 | 111.7 |
| 1D | 1607 | 113.4 |
| 1E | 1202 | 86.2 |
| 1F | 1382 | 102.8 |
| 1G | 1503 | 108.7 |
| 1H | 1495 | 105.8 |
| 1I | 1271 | 99.0 |
| 1J | 1420 | 105.3 |
| 1K | 1355 | 106.0 |
| 1L | 1392 | 105.7 |
| 1M | 1332 | 101.6 |
| 1N | 1293 | 101.8 |

As can be seen from the data set forth in Table 2, Samples 1A-1D exhibited significantly higher flexural modulus (70-400 MPa higher) than Samples 1E-1N. Further, Samples 1A-1D exhibited a heat deflection temperature that was at least 3° C. greater than that exhibited by Samples 1E-1N.

EXAMPLE 2

The following examples demonstrates the production of polymer compositions according to the invention. The example further describes certain physical properties exhibited by the polymer compositions.

Ten polymer compositions (Samples 2A-2J) were produced with additive compositions as described in Table 3 below. The polymer compositions were produced by individually adding the necessary salts to the polymer. In the table, "PE" denotes the 2,2'-methylene-bis-(4,6-di-tert-butylphenyl) phosphate anion, and "AC" denotes the benzoate anion, except for Sample 2J in which the anion is the 4-tert-butylbenzoate anion. The mole percentage (mol. %) of anions reported in the table is the mole percentage of the total amount of phosphate ester anions and aromatic carboxylate anions present in the additive composition. The mole percentage (mol. %) of cations reported in the table is the mole percentage of the total amount of sodium cations, aluminum (III) cations, lithium cations, and zinc (II) cations present in the additive composition. Sample 2E was 100% calcium stearate. Each polymer composition contained a polypropylene homopolymer (Profax 6301, 12 MFR), 500 ppm Irganox® 1010 (primary antioxidant), and 1000 ppm Irgafos® 168 (secondary antioxidant). The polypropylene homopolymer compositions were compounded on a Delta-Plast single screw extruder. The barrel temperature of the extruder was ramped from 200 to 230° C., and the screw speed was set at approximate 130 rpm. Sample bars were formed by injection molding on an Arburg 40 ton injection molder. The molder was set at a temperature anywhere between 190 and 260° C. The injection speed was 14 cc/sec. The bars had dimensions of about 80 mm×10 mm×4 mm. The bars were tested to determine flexural properties and HDT as described above in Example 1. The results of these tests are set forth in Table 4 below.

TABLE 3

Composition of Samples 2A-2J.

| Sample | Anions (mol. %) | | Cations (mol. %) | | | | Fatty acid (wt. % of additive) | Fatty acid (ppm in polymer) |
|---|---|---|---|---|---|---|---|---|
| | PE | AC | Na | Al(III) | Li | Zn(II) | | |
| 2A | 46.8 | 53.2 | 49.5 | 10.8 | 38.2 | 1.5 | 51.95 | 779.3 |
| 2B | 31.9 | 68.1 | 68.2 | 12.9 | 18.9 | 0.0 | 27.04 | 405.6 |
| 2C | 16.9 | 83.1 | 81.0 | 7.0 | 12.1 | 0.0 | 26.44 | 396.6 |
| 2D | 22.1 | 77.9 | 91.2 | 8.8 | 0.0 | 0.0 | 30.83 | 1850.0 |
| 2E | 0 | 0 | 0 | 0 | 0 | 0 | 100 | 400 |
| 2F | 100 | 0 | 0 | 22 | 78 | 0 | 43.67 | 655 |
| 2G | 100 | 0 | 100 | 0 | 0 | 0 | 0 | 0 |
| 2H | 0 | 100 | 100 | 0 | 0 | 0 | 0 | 0 |
| 2I | 100 | 0 | 0 | 100 | 0 | 0 | 0 | 0 |
| 2J | 0.0 | 100.0 | 0.0 | 100 | 0.0 | 0 | 0 | 0 |

TABLE 4

Flexural modulus and heat deflection temperature (HDT) for Samples 2A-2J.

| Sample | Chord Flexural Modulus (MPa) | HDT at 0.455 MPa (° C.) |
|---|---|---|
| 2A | 1781 | 115.2 |
| 2B | 1823 | 115.5 |

TABLE 4-continued

Flexural modulus and heat deflection temperature (HDT) for Samples 2A-2J.

| Sample | Chord Flexural Modulus (MPa) | HDT at 0.455 MPa (° C.) |
|---|---|---|
| 2C | 1779 | 116.2 |
| 2D | 1750 | 114.2 |
| 2E | 1303 | 85.1 |
| 2F | 1604 | 98.9 |
| 2G | 1668 | 103.5 |
| 2H | 1565 | 105.6 |
| 2I | 1302 | 95.0 |
| 2J | 1366 | 103.0 |

As can be seen from the data set forth in Table 4, Samples 2A-2D exhibit significantly higher flexural modulus (80-521 MPa higher) than Samples 2E-2J. Further, Samples 2A-2D exhibited a heat deflection temperature that was at least 8.6° C. greater than that exhibited by Samples 2E-2J.

EXAMPLE 3

The following examples demonstrates the production of polymer compositions according to the invention. The example further describes certain physical properties exhibited by the polymer compositions.

Twelve polymer compositions (Samples 3A-3L) were produced with additive compositions as described in Table 5 below. The polymer compositions were produced by individually adding the necessary salts to the polymer. In the table, "PE" denotes the 2,2'-methylene-bis-(4,6-di-tert-butylphenyl) phosphate anion, "CD" denotes the cis-endo-bicyclo[2.2.1]heptane-2,3-dicarboxylate anion for Samples 3A and 3B and the cis-hexahydrophthalate anion for Sample 3C, and "AC" denotes the benzoate anion, except for Sample 31 in which the anion is the 4-tert-butylbenzoate anion. The mole percentage (mol. %) of anions reported in the table is the mole percentage of the total amount of phosphate ester anions, cycloaliphatic dicarboxylate anions, and aromatic carboxylate anions present in the additive composition. The mole percentage (mol. %) of cations reported in the table is the mole percentage of the total amount of sodium cations, aluminum (III) cations, calcium cations, lithium cations, and zinc (II) cations present in the additive composition. Sample 3D was 100% calcium stearate. Each polymer composition contained a 26 MFR polypropylene impact copolymer (Prime Polymer J707P), 500 ppm Irganox® 1010 (primary antioxidant), and 1000 ppm Irgafos® 168 (secondary antioxidant). The polymer compositions were compounded on a Leistritz twin screw extruder. The barrel temperature of the extruder was ramped from 160 to 190° C., and the screw speed was set at approximately 450 rpm. Sample bars were formed from each polymer composition by injection molding on an Arburg 40 ton injection molder. The molder was set at a temperature ranging between 190 and 260° C. The injection speed was 14 cc/sec. The sample bars had dimensions of 80 mm×10 mm×4 mm.

TABLE 5

Composition of Samples 3A-3L.

| | Anions Composition (mol. %) | | | Cations composition (mol. %) | | | | | Fatty acid (wt. % of | Fatty acid (ppm in |
|---|---|---|---|---|---|---|---|---|---|---|
| Sample | PE | CD | AC | Na | Al(III) | Ca | Li | Zn(II) | additive) | polymer) |
| 3A | 25.7 | 41.5 | 32.8 | 77.8 | 7.2 | 0.0 | 5.7 | 9.4 | 38.88 | 1166.4 |
| 3B | 38.6 | 13.7 | 47.7 | 85.6 | 14.4 | 0.0 | 0.0 | 0.0 | 26.83 | 536.5 |
| 3C | 22.8 | 32.0 | 45.2 | 79.2 | 8.8 | 12.0 | 0.0 | 0.0 | 21.28 | 425.5 |
| 3D | 0 | 0 | 0 | 0 | 0 | 100 | 0 | 0 | 100 | 400 |
| 3E | 100 | 0 | 0 | 0 | 22 | 0.0 | 78 | 0 | 43.67 | 655 |
| 3F | 100 | 0 | 0 | 100 | 0 | 0.0 | 0 | 0 | 0 | 0 |
| 3G | 0 | 0 | 100 | 100 | 0 | 0.0 | 0 | 0 | 0 | 0 |
| 3H | 100 | 0 | 0 | 0 | 100 | 0.0 | 0 | 0 | 0 | 0 |
| 3I | 0.0 | 0.0 | 100.0 | 0.0 | 45.0 | 0.0 | 0.0 | 0.0 | 0.0 | 0.0 |
| 3J | 0.0 | 100.0 | 0.0 | 0 | 0 | 69.4 | 0 | 30.6 | 32.01 | 320.1 |
| 3K | 0.0 | 100.0 | 0.0 | 100.0 | 0.0 | 0.0 | 0.0 | 0.0 | 0.0 | 0.0 |
| 3L | 80.0 | 20.0 | 0 | 0 | 67.0 | 33.0 | 0.0 | 0.0 | 0.0 | 0.0 |

The peak polymer crystallization temperature (Tc) was measured using a differential scanning calorimeter (Mettler-Toledo DSC822 differential scanning calorimeter). An approximately five milligram sample of the polymer composition was heated at a rate of approximately at 20° C./minute from 50° C. to 220° C., held at a temperature of 220° C. for 2 minutes to remove any thermal history, and then cooled at a rate of 20° C./minute to 50° C. The peak of the crystallization exotherm (which is the temperature at which peak polymer crystal formation occurs) was then recorded as the peak polymer crystallization temperature (Tc). The flexural modulus of each sample were measured as described in Example 1. Table 6 sets forth the results of the flexural modulus and peak polymer crystallization temperature tests.

TABLE 6

Flexural modulus and peak polymer crystallization temperature for Samples 3A-3L.

| Sample | Chord Flexural Modulus (MPa) | $T_c$ (° C.) |
|---|---|---|
| 3A | 1545 | 133.2 |
| 3B | 1543 | 131.4 |
| 3C | 1519 | 132.0 |
| 3D | 1202 | 115.0 |
| 3E | 1382 | 123.5 |
| 3F | 1503 | 130.5 |
| 3G | 1495 | 129.8 |
| 3H | 1271 | 122.5 |
| 3I | 1420 | 129.2 |
| 3J | 1379 | 126.3 |
| 3K | 1377 | 132.5 |
| 3L | 1450 | 129.3 |

As can be seen from the data set forth in Table 6, Samples 3A-3C exhibited higher flexural modulus than Samples 3D-3L. Further, Samples 3A-3C exhibited peak polymer crystallization temperatures that were appreciably higher than 130° C.

EXAMPLE 4

The following examples demonstrates the production of polymer compositions according to the invention. The example further describes certain physical properties exhibited by the polymer compositions.

Twelve polymer compositions (Samples 4A-4L) were produced with additive compositions as described in Table 7 below. The polymer compositions were produced by individually adding the necessary salts to the polymer. In the table, “PE” denotes the 2,2'-methylene-bis-(4,6-di-tert-butylphenyl) phosphate anion, “CD” denotes the cis-endo-bicyclo[2.2.1]heptane-2,3-dicarboxylate anion for Samples 4A and 4B and the cis-hexahydrophthalate anion for Sample 4C, and “AC” denotes the benzoate anion, except for Sample 41 in which the anion is the 4-tert-butylbenzoate anion. The mole percentage (mol. %) of anions reported in the table is the mole percentage of the total amount of phosphate ester anions, cycloaliphatic dicarboxylate anions, and aromatic carboxylate anions present in the additive composition. The mole percentage (mol. %) of cations reported in the table is the mole percentage of the total amount of sodium cations, aluminum (III) cations, calcium cations, lithium cations, and zinc (II) cations present in the additive composition. Sample 4D was 100% calcium stearate. Each polymer composition contained a polypropylene homopolymer (Profax 6301, 12 MFR), 500 ppm Irganox® 1010 (primary antioxidant), and 1000 ppm Irgafos® 168 (secondary antioxidant). The polypropylene homopolymer compositions were compounded on a DeltaPlast single screw extruder. The barrel temperature of the extruder was ramped from 200 to 230° C., and the screw speed was set at approximate 130 rpm. Sample bars were formed by injection molding on an Arburg 40 ton injection molder. The molder was set at a temperature anywhere between 190 and 260° C. The injection speed was 14 cc/sec. The bars had dimensions of about 80 mm×10 mm×4 mm.

TABLE 7

Composition of Samples 4A-4L.

| Sample | Anions Composition (mol. %) PE | CD | AC | Cations composition (mol. %) Na | Al(III) | Ca | Li | Zn(II) | Fatty acid (wt. % of additive) | Fatty acid (ppm in polymer) |
|---|---|---|---|---|---|---|---|---|---|---|
| 4A | 25.7 | 41.5 | 32.8 | 77.8 | 7.2 | 0.0 | 5.7 | 9.4 | 38.88 | 1166.4 |
| 4B | 38.6 | 13.7 | 47.7 | 85.6 | 14.4 | 0.0 | 0.0 | 0.0 | 26.83 | 536.5 |
| 4C | 22.8 | 32.0 | 45.2 | 79.2 | 8.8 | 12.0 | 0.0 | 0.0 | 21.28 | 425.5 |
| 4D | 0 | 0 | 0 | 0 | 0 | 100 | 0 | 0 | 100 | 400 |
| 4E | 100 | 0 | 0 | 0 | 22 | 0.0 | 78 | 0 | 43.67 | 655 |
| 4F | 100 | 0 | 0 | 100 | 0 | 0.0 | 0 | 0 | 0 | 0 |
| 4G | 0 | 0 | 100 | 100 | 0 | 0.0 | 0 | 0 | 0 | 0 |
| 4H | 100 | 0 | 0 | 0 | 100 | 0.0 | 0 | 0 | 0 | 0 |
| 4I | 0.0 | 0.0 | 100.0 | 0.0 | 45.0 | 0.0 | 0.0 | 0.0 | 0.0 | 0.0 |
| 4J | 0.0 | 100.0 | 0.0 | 0 | 0 | 69.4 | 0 | 30.6 | 32.01 | 320.1 |
| 4K | 0.0 | 100.0 | 0.0 | 100.0 | 0.0 | 0.0 | 0.0 | 0.0 | 0.0 | 0.0 |
| 4L | 80.0 | 20.0 | 0 | 0 | 67.0 | 33.0 | 0.0 | 0.0 | 0.0 | 0.0 |

The peak polymer crystallization temperature (Tc) was measured as described in Example 3. The flexural modulus of each sample was measured as described in Example 1. Table 8 sets forth the results of the flexural modulus and peak polymer crystallization temperature tests.

TABLE 8

Flexural modulus and peak polymer crystallization temperature for Samples 4A-4L.

| Sample | Chord Flexural Modulus (MPa) | $T_c$ (° C.) |
|---|---|---|
| 4A | 1748 | 130.9 |
| 4B | 1714 | 130.3 |
| 4C | 1743 | 131.0 |
| 4D | 1303 | 115.7 |
| 4E | 1604 | 124.8 |
| 4F | 1668 | 128.3 |
| 4G | 1565 | 126.7 |
| 4H | 1302 | 115.8 |
| 4I | 1366 | 125.8 |
| 4J | 1537 | 124.5 |
| 4K | 1483 | 130.5 |
| 4L | 1498 | 127.6 |

As can be seen from the data set forth in Table 8, Samples 4A-4C exhibited significantly higher flexural modulus (45-446 MPa higher) than Samples 4D-4L. Further, Samples 4A-4C exhibited peak polymer crystallization temperatures that were higher than 130° C.

All references, including publications, patent applications, and patents, cited herein are hereby incorporated by reference to the same extent as if each reference were individually and specifically indicated to be incorporated by reference and were set forth in its entirety herein.

The use of the terms “a” and “an” and “the” and similar referents in the context of describing the subject matter of this application (especially in the context of the following claims) are to be construed to cover both the singular and the plural, unless otherwise indicated herein or clearly contradicted by context. The terms “comprising,” “having,” “including,” and “containing” are to be construed as open-ended terms (i.e., meaning “including, but not limited to,”) unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., “such as”) provided herein, is intended merely to better illuminate the subject matter of the application and does not pose a limitation on the scope of the subject matter unless otherwise claimed. No language in the specification should be construed as indicating any non-claimed element as essential to the practice of the subject matter described herein.

Preferred embodiments of the subject matter of this application are described herein, including the best mode known to the inventors for carrying out the claimed subject matter. Variations of those preferred embodiments may become apparent to those of ordinary skill in the art upon reading the foregoing description. The inventors expect skilled artisans to employ such variations as appropriate, and the inventors intend for the subject matter described herein to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the present disclosure unless otherwise indicated herein or otherwise clearly contradicted by context.

What is claimed is:

1. A method for making a polymer composition comprising the steps of (1) mixing (a) phosphate ester anions, (b) aromatic carboxylate anions, (c) cycloaliphatic dicarboxylate anions, (d) aluminum (III) cations, (e) sodium cations, (f) optionally, lithium cations, (g) optionally, zinc (II) cations, and (h) optionally, calcium cations to produce an additive composition, and (2) melt mixing the additive composition and a polypropylene polymer to produce a polymer composition, wherein:

(i) the polypropylene polymer is selected from the group consisting of polypropylene homopolymers, polypropylene copolymers, and mixtures thereof;

(ii) the phosphate ester anions conform to the structure of Formula (I)

(I)

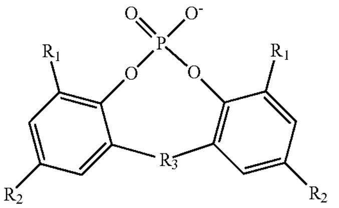

wherein $R_1$ and $R_2$ are independently selected from the group consisting of hydrogen and $C_1$-$C_{18}$ alkyl groups, and Rs is an alkanediyl group;

(iii) the cycloaliphatic dicarboxylate anions conform to the structure of Formula (X)

(X)

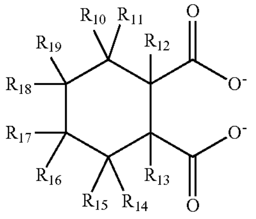

wherein $R_{10}$, $R_{11}$, $R_{12}$, $R_{13}$, $R_{14}$, $R_{15}$, $R_{16}$, $R_{17}$, $R_{18}$, and $R_{19}$ are independently selected from the group consisting of hydrogen and $C_1$-$C_9$ alkyl groups;

(iv) the phosphate ester anions are present in the additive composition in an amount of about 5 mol. % to about 40 mol. % of the total amount of phosphate ester anions, aromatic carboxylate anions, and cycloaliphatic dicarboxylate anions present in the additive composition;

(v) the aromatic carboxylate anions are present in the additive composition in an amount of about 20 mol. % to about 60 mol. % of the total amount of phosphate ester anions, aromatic carboxylate anions, and cycloaliphatic dicarboxylate anions present in the additive composition;

(vi) the cycloaliphatic dicarboxylate anions are present in the additive composition in an amount of about 5 mol. % to about 55 mol. % of the total amount of phosphate ester anions, aromatic carboxylate anions, and cycloaliphatic dicarboxylate anions present in the additive composition;

(vii) the aluminum (III) cations are present in the additive composition in an amount of about 5 mol. % to about 15 mol. % of the total amount of aluminum (III) cations, sodium cations, lithium cations, zinc (II) cations, and calcium cations present in the additive composition;

(viii) the sodium cations are present in the additive composition in an amount of about 30 mol. % to about 95 mol. % of the total amount of aluminum (III) cations, sodium cations, lithium cations, zinc (II) cations, and calcium cations present in the additive composition;

(ix) the lithium cations, if present, are present in the additive composition in an amount of about 0.5 mol. % to about 30 mol. % of the total amount of aluminum (III) cations, sodium cations, lithium cations, zinc (II) cations, and calcium cations present in the additive composition;

(x) the zinc (II) cations, if present, are present in the additive composition in an amount of about 0.1 mol. % to about 15 mol. % of the total amount of aluminum (II)) cations, sodium cations, lithium cations, zinc (II) cations, and calcium cations present in the additive composition;

(xi) the calcium cations, if present, are present in the additive composition in an amount of about 5 mol. % or more of the total amount of aluminum (III) cations, sodium cations, lithium cations, zinc (II) cations, and calcium cations present in the additive composition; and (xii) the additive composition contains 5 wt. % or more fatty acid salts selected from the group consisting of alkali metal, alkaline earth metal, and zinc (II) salts of saturated and unsaturated fatty acids.

2. The method of claim 1, wherein $R_1$ and $R_2$ are selected from the group consisting of hydrogen and $C_1$-$C_4$ alkyl groups.

3. The method of claim 2, wherein $R_1$ and $R_2$ are tert-butyl groups.

4. The method of claim 1, wherein $R_3$ is a $C_1$-$C_4$ alkanediyl group.

5. The method of claim 4, wherein $R_3$ is a methanediyl group.

6. The method of claim 1, wherein the aromatic carboxylate anions are benzoate anions.

7. The method of claim 1, wherein the phosphate ester anions are present in the additive composition in an amount of about 10 mol. % to about 40 mol. % of the total amount of phosphate ester anions, aromatic carboxylate anions, and cycloaliphatic dicarboxylate anions present in the additive composition.

8. The method of claim 1, wherein the aromatic carboxylate anions are present in the additive composition in an amount of about 20 mol. % to about 50 mol. % of the total amount of phosphate ester anions, aromatic carboxylate anions, and cycloaliphatic dicarboxylate anions present in the additive composition.

9. The method of claim 1, wherein the sodium cations are present in the additive composition in an amount of about 30 mol. % to about 90 mol. % of the total amount of aluminum (III) cations, sodium cations, lithium cations, zinc (II) cations, and calcium cations present in the additive composition.

10. The method of claim 1, wherein the additive composition comprises lithium cations, and the lithium cations are present in the additive composition in an amount of about 2 mol. % to about 20 mol. % of the total amount of aluminum (III) cations, sodium cations, lithium cations, zinc (II) cations, and calcium cations present in the additive composition.

11. The method of claim 1, wherein the additive composition comprises zinc (II) cations, and the zinc (II) cations are present in the additive composition in an amount of about 0.1 mol. % to about 5 mol. % of the total amount of aluminum (III) cations, sodium cations, lithium cations, zinc (II) cations, and calcium cations present in the additive composition.

12. The method of claim 1, wherein the additive composition contains about 20 wt. % to about 55 wt. % fatty acid salts.

13. The method of claim 1, wherein the cycloaliphatic dicarboxylate anions are present in the additive composition in an amount of about 10 mol. % to about 50 mol. % of the total amount of phosphate ester anions, aromatic carboxylate anions, and cycloaliphatic dicarboxylate anions present in the additive composition.

14. The method of claim 1, wherein fatty acid salt is selected from the group consisting of alkali metal salts of myristic acid and alkali metal salts of stearic acid.

* * * * *